(12) United States Patent  
Maeda (10) Patent No.: US 6,685,525 B1
(45) Date of Patent: Feb. 3, 2004

(54) METHOD FOR MANUFACTURING AN INCANDESCENT LAMP

(75) Inventor: Kazuo Maeda, Takatsuki (JP)

(73) Assignee: Matsushita Electric Industrial Co., Ltd., Kadomi (JP)

( * ) Notice: Subject to any disclaimer, the term of this patent is extended or adjusted under 35 U.S.C. 154(b) by 640 days.

(21) Appl. No.: 09/594,557

(22) Filed: Jun. 15, 2000

(30) Foreign Application Priority Data

Jun. 23, 1999 (JP) .......................................... 11-176470

(51) Int. Cl.⁷ ................................ H01J 9/00; H01J 9/20
(52) U.S. Cl. ...................... 445/27; 445/22; 220/2.1 R; 220/2.2; 174/17.05; 65/54; 65/55
(58) Field of Search .............................. 445/22, 26, 27; 220/2.1 R, 2.2; 174/17.05; 65/54, 55

(56) References Cited

U.S. PATENT DOCUMENTS

| 2,235,515 | A | * | 3/1941 | Carpenter | 445/27 |
|---|---|---|---|---|---|
| 3,594,884 | A | * | 7/1971 | Siegel | 445/27 |
| 3,685,880 | A | * | 8/1972 | Sobieski | 445/26 |
| 3,810,684 | A | | 5/1974 | Robinson | 445/43 |
| 4,434,386 | A | * | 2/1984 | Lowe | 445/27 |
| 4,723,092 | A | * | 2/1988 | Heider et al. | 65/55 |
| 4,756,701 | A | | 7/1988 | Danko et al. | 445/22 |
| 5,133,682 | A | * | 7/1992 | Gilligan et al. | 445/26 |
| 6,517,404 | B1 | * | 2/2003 | Lamouri et al. | 445/26 |

FOREIGN PATENT DOCUMENTS

| JP | 05-174710 | 7/1993 | H01J/9/24 |
|---|---|---|---|
| JP | 06-181048 | 6/1994 | H01J/61/30 |

* cited by examiner

Primary Examiner—Kenneth J. Ramsey
Assistant Examiner—Mariceli Santiago (57) ABSTRACT

A method for manufacturing an inexpensive lamp, which suppresses distortion of a bulb and prevents decrease in commercial value and breakage of the bulb. In a glass bulb having one end thereof communicating with an exhaust tube, an assembly of a filament, metal foils and lead wires is disposed. In this state, the whole glass bulb is heated by a burner. The end opposite to the exhaust tube of the glass bulb is pinch-sealed to form a pinch-sealed portion. Subsequently, an expanded portion is formed by charging a protective gas from the exhaust tube into the glass bulb.

4 Claims, 8 Drawing Sheets

METHOD FOR MANUFACTURING AN INCANDESCENT LAMP

FIELD OF THE INVENTION

The present invention relates to a method for manufacturing an incandescent lamp.

BACKGROUND OF THE INVENTION

Figure 8:
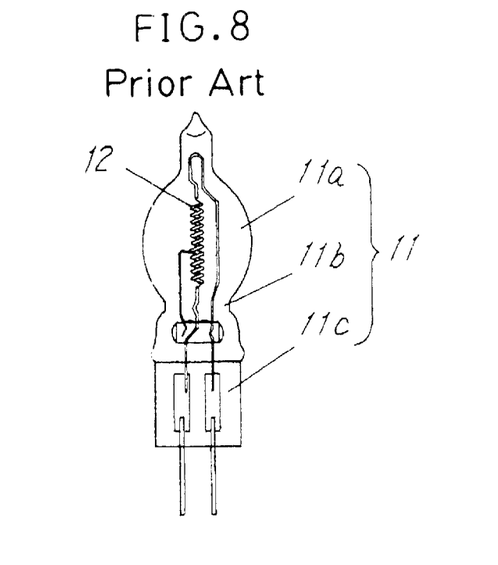
FIG. 8 is a front view of a conventional tungsten halogen lamp.
Figure 9:
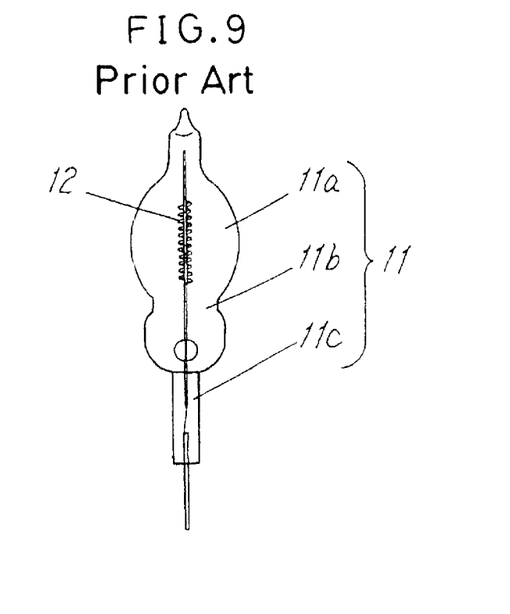
FIG. 9 is a side view of the tungsten halogen lamp.

A conventional incandescent lamp, for example, a tungsten halogen lamp which lights up with a commercial voltage comprises, as shown in the front view of FIG. 8 and the side view of FIG. 9, a bulb 11 having an overall length of 55 mm. The bulb 11 has a spheroidal expanded portion 11a, a narrowed portion 11b and a pinch-sealed portion 11c. The bulb 11 contains inside thereof a filament assembly 12 comprised of a filament coil. The maximum outside diameter of the expanded portion 11a is 14 mm.

A method for manufacturing such a tungsten halogen lamp is as follows.

Figure 10:
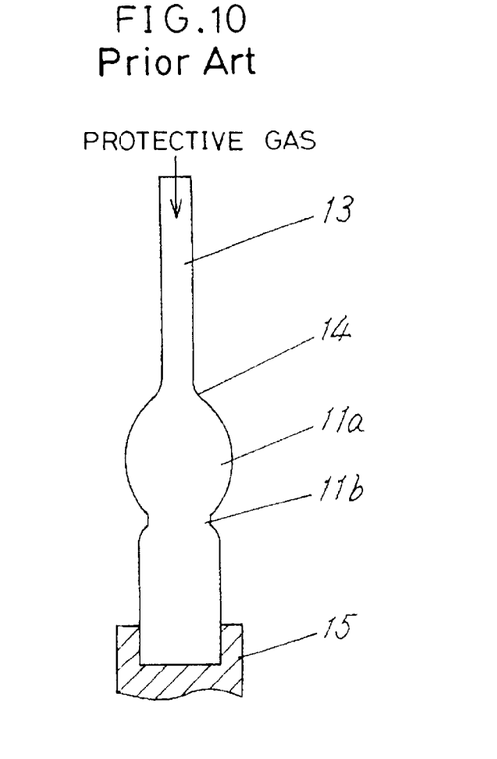
FIG. 10 illustrates a conventional method for manufacturing the tungsten halogen lamp.

As shown in FIG. 10, a cylindrical glass bulb 14 communicating at one end thereof with an exhaust tube 13 is heated to be softened by a burner (not shown). Afterwards, while closing the end opposite to the exhaust tube 13 of the glass bulb 14 with a closing member 15 and charging a protective gas from the exhaust tube 13, dies (not shown) are pressed to the end on the exhaust tube 13 side of the glass bulb 14, thereby forming the expanded portion 11a and the cylindrical narrowed portion 11b.

Figure 11:
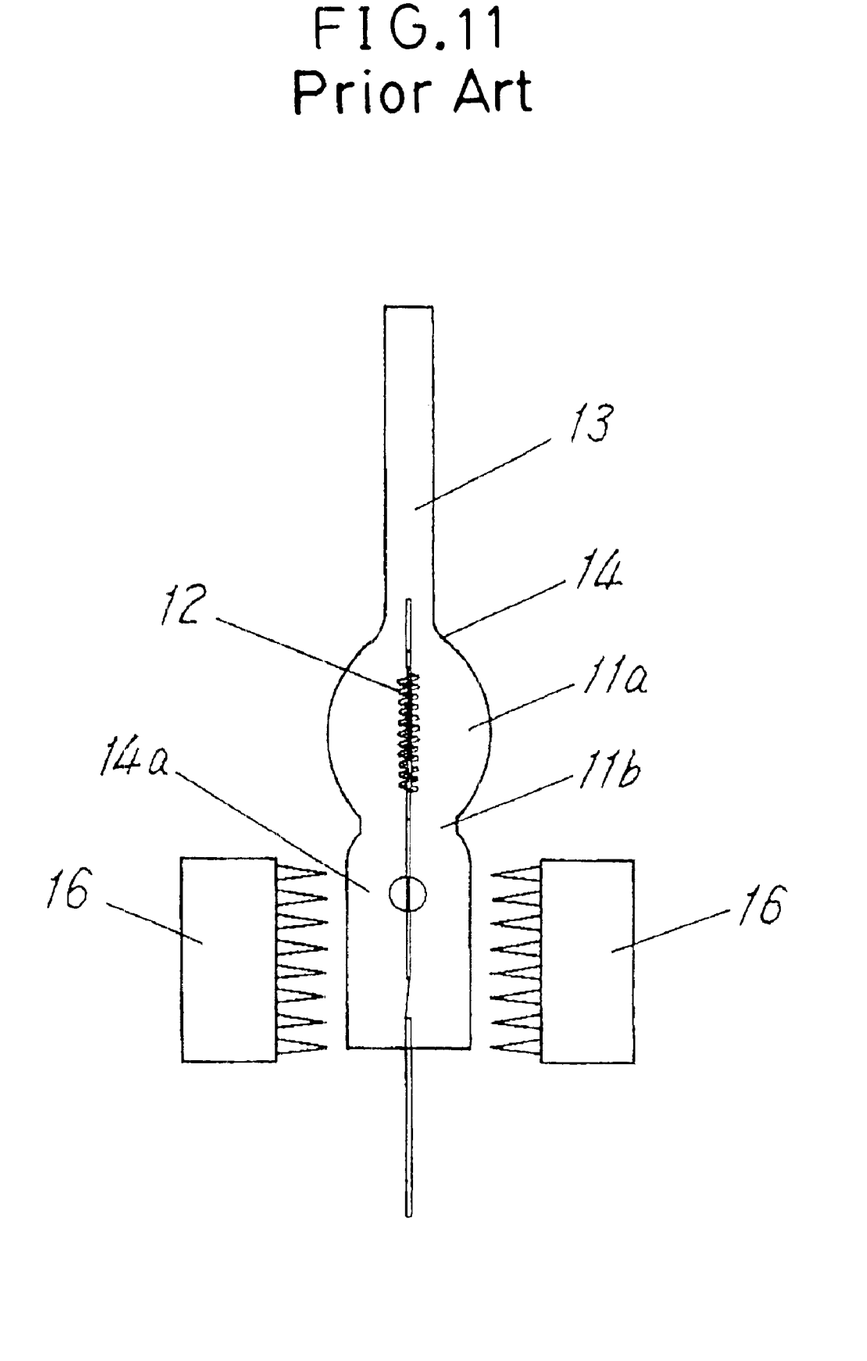
FIG. 11 illustrates the conventional method for manufacturing the tungsten halogen lamp.
Figure 12:
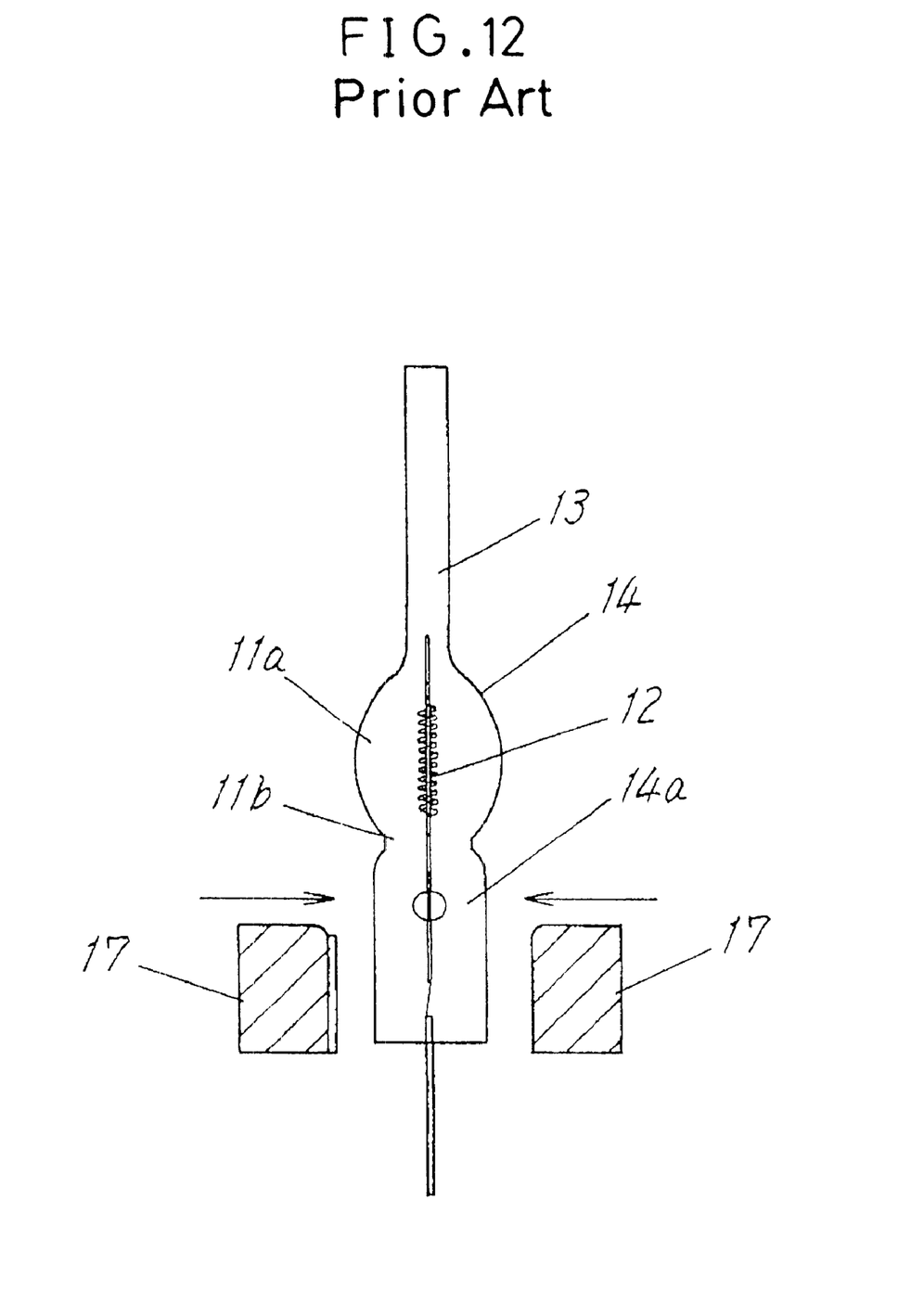
FIG. 12 illustrates the conventional method for manufacturing the tungsten halogen lamp.
Figure 13:
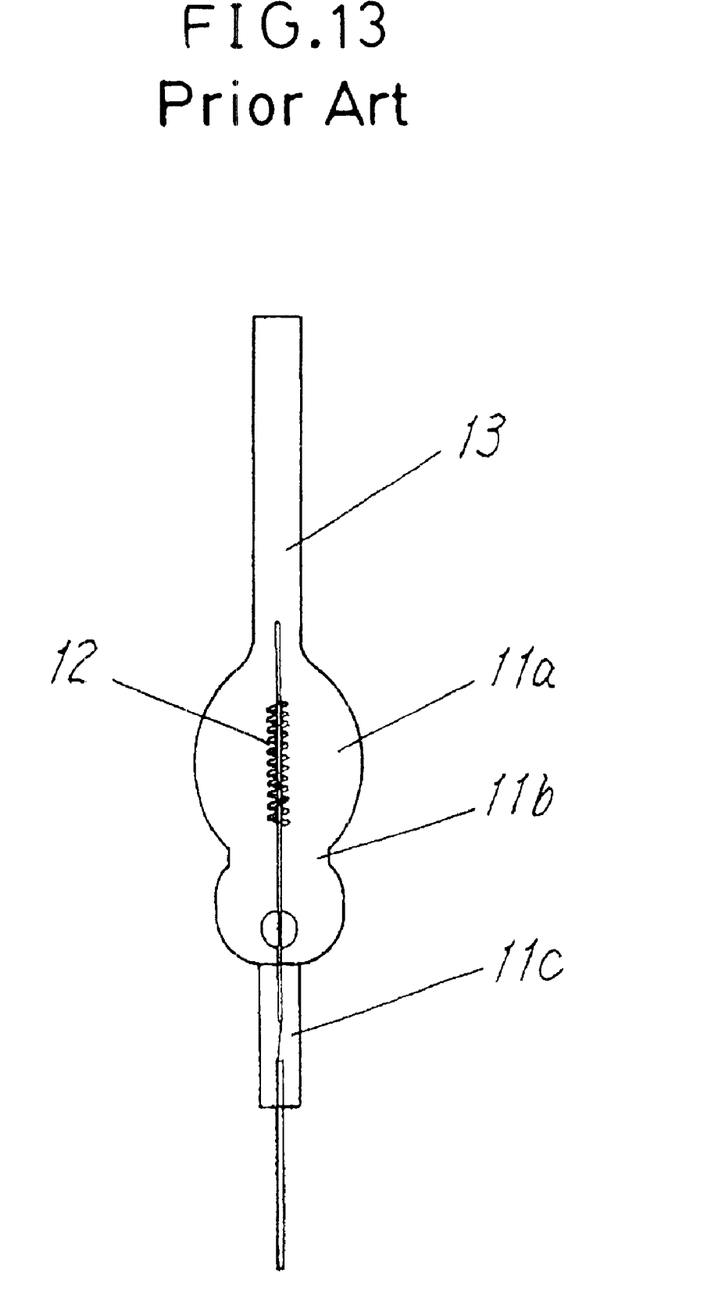
FIG. 13 illustrates the conventional method for manufacturing the tungsten halogen lamp.

Then, as shown in FIG. 11, the closing member 15 is detached and the filament assembly 12 is disposed inside the glass bulb 14. A cylindrical portion 14a opposite to the exhaust tube 13 of the glass bulb 14 is heated to be softened by a burner 16, and as shown in FIG. 12, the cylindrical portion 14a is pinch-sealed by dies 17 having an L shape in cross section, thereby forming the pinch-sealed portion 11c as shown in FIG. 13.

The glass bulb 14 is pumped through the exhaust tube 13 and is filled with a predetermined amount of a filling gas, and the exhaust tube 13 is sealed. In this manner, a tungsten halogen lamp is manufactured.

Such a conventional method for manufacturing the tungsten halogen lamp does not pose a problem when it is applied to a lamp which burns with a commercial voltage. In the case of manufacturing a smaller tungsten halogen lamp which burns with a lower voltage of, for example, about 12V or 24V, however, the following problems arise. When the expanded portion 11a and the narrowed portion 11b are formed in advance and then the pinch-sealed portion 11c is formed, due to the effects of heat of the burner 16 at the time of pinch-sealing and of the pinch-sealing itself, the expanded portion 11a and the narrowed portion 11b are distorted, and the commercial value of the lamp deteriorates.

The distortion of the expanded portion 1 1a and the narrowed portion 11b causes the thickness of each of the expanded portion 11a and the narrowed portion 11b to vary. As a result, a problem arises that the bulb 11 is broken due to the pressure of the filling gas (higher than 1 atmospheric pressure) when the lamp is burned.

Further, it is necessary to close the end opposite to the exhaust tube 13 of the glass bulb 14 with the closing member 15 in order to form the expanded portion 11a and the narrowed portion 11b. It causes a problem that the number of manufacturing steps increases and the cost becomes higher. The present invention has been achieved to solve these problems and has an object to provide a method for manufacturing an inexpensive lamp capable of preventing distortion of the bulb, decrease in the commercial value and breakage of the bulb.

SUMMARY OF THE INVENTION

According to the invention, there is provided a method for manufacturing a lamp comprising a bulb containing therein a filament assembly and having an expanded portion and a pinch-sealed portion, the method comprising the steps of: softening a bulb communicating at one end thereof with an exhaust tube, with the filament assembly disposed inside the bulb; pinch-sealing the end opposite to the exhaust tube of the bulb; and then forming the expanded portion by pressing dies each having a predetermined shape to the bulb by charging a protective gas from the exhaust tube.

Consequently, distortion of the bulb can be prevented and the manufacturing process can be simplified.

PREFERRED EMBODIMENT

An embodiment of the invention will be described hereinbelow with reference to the drawings.

Figure 1:
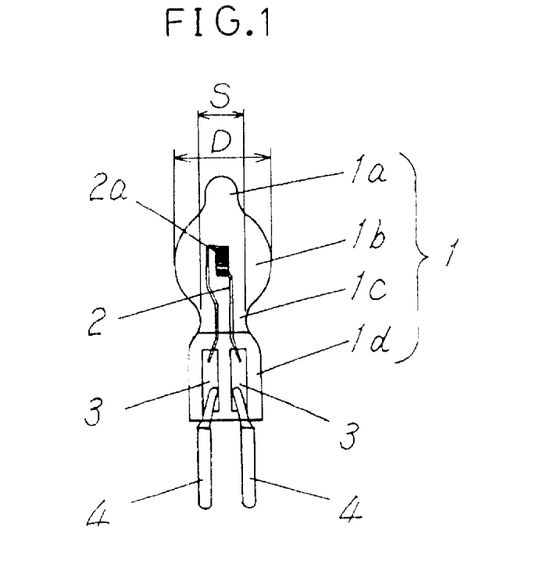
FIG. 1 is a front view of a one-end-sealed tungsten halogen lamp manufactured by a method according to an embodiment of the invention.
Figure 2:
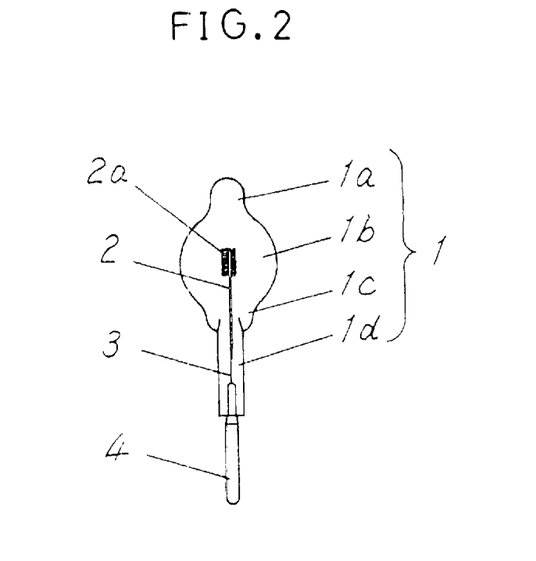
FIG. 2 is a side view of the tungsten halogen lamp.

As shown in the front view of FIG. 1 and the side view of FIG. 2, a tungsten halogen lamp with one end sealed, which is rated at 12V and 50 W and is manufactured by using a manufacturing method according to an embodiment of the invention, has an overall length of 43 mm, and comprises a bulb 1 having a sealing tip 1a, an expanded portion 1b, a narrowed portion 1c, and a pinch-sealed portion id sequentially formed into one body.

The bulb 1 is filled with a predetermined amount of a halogen element and a rare gas.

The expanded portion 1b has a spheroidal shape. The focal interval of the spheroid is 3.5 mm and the outside diameter in the minor axis direction of the expanded portion 1b is 12 mm. The outside diameter of the narrowed portion 1c is 5.5 mm.

In the expanded portion 1b, a filament 2 comprising a filament coil made of tungsten is provided. A coil 2a of the filament 2 has a length of 3.5 mm and both ends of the coil 2a are positioned at the focal points of the spheroid. The filament 2 is connected to lead wires 4 via metal foils 3 sealed in the pinch-sealed portion 1d.

The method for manufacturing this tungsten halogen lamp will now be described.

Figure 3:
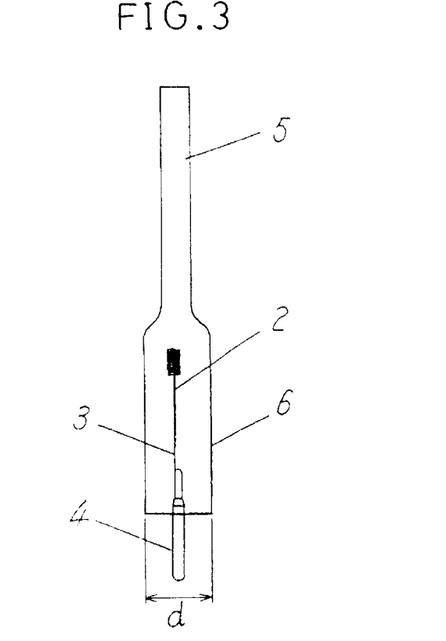
FIG. 3 illustrates a manufacturing method according to the embodiment of the invention.

First, as shown in FIG. 3, an assembly of the filament 2, metal foils 3 and lead wires 4 is disposed in a cylindrical glass bulb 6 having the outside diameter of 9 mm. An exhaust tube 5 is previously communicated with one end of the glass bulb 6. At this time, the filament 2 is disposed in the glass bulb 6 at a portion which will be formed into the expanded portion 1b.

A 214 fused quartz tube of 8 mm (inside diameter)×10 mm (outside diameter) manufactured by GE is used for the glass bulb 6.

Figure 4:
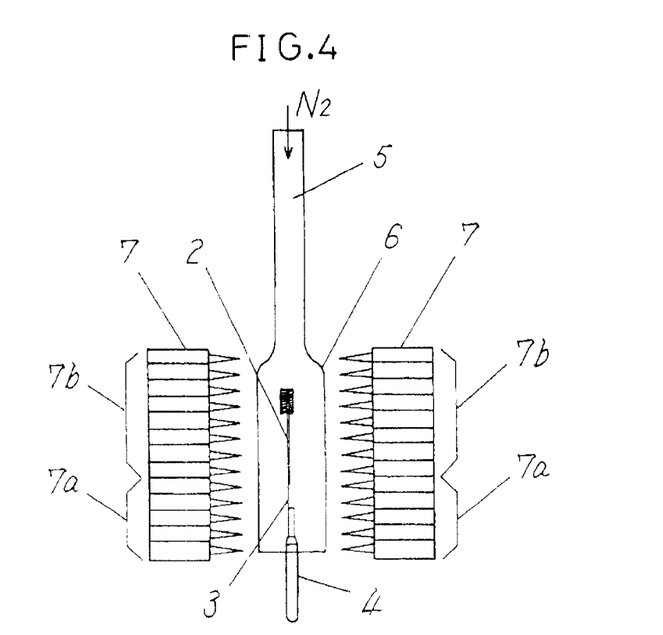
FIG. 4 illustrates the manufacturing method according to the embodiment of the invention.

Afterwards, as shown in FIG. 4, while charging a protective gas such as nitrogen from the exhaust tube 5 into the glass bulb 6, the whole glass bulb 6 is heated by a burner 7 using a mixture gas of oxygen and hydrogen. The burner 7 is comprised of a first burner unit 7a for heating a portion corresponding to the pinch-sealed portion id of the glass bulb 6 and a second burner unit 7b for heating a portion corresponding to the expanded portion 1b and narrowed portion 1c.

Figure 5:
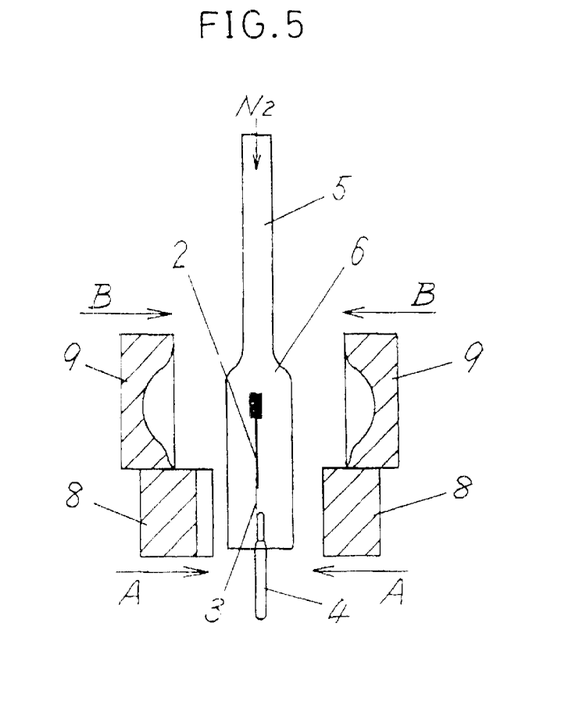
FIG. 5 illustrates the manufacturing method according to the embodiment of the invention.
Figure 6:
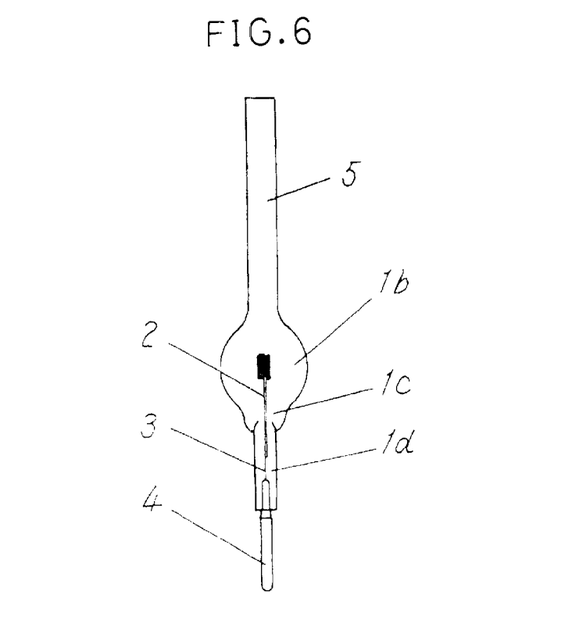
FIG. 6 illustrates the manufacturing method according to the embodiment of the invention.

After the portion corresponding to the pinch-sealed portion 1d of the glass bulb 6 reaches a predetermined temperature and is softened, the flame of the first burner unit 7a is stopped. As shown in FIG. 5, a pair of dies 8 each having an L shape in cross section are instantaneously moved in the direction A to pinch-seal the end opposite to the exhaust tube 5 of the glass bulb 6 by the dies 8, thereby forming the pinch-sealed portion 1d as shown in FIG. 6. While the pinch-sealed portion 1d is being formed after heating, although not shown in FIG. 5, the portion corresponding to the expanded portion 1b and narrowed portion 1c is continuously heated by the second burner unit 7b. Immediately after the pinch-sealed portion 1d is formed, by charging a protective gas such as nitrogen from the exhaust tube 5 into the glass bulb 6, a pair of dies 9 each having a predetermined shape for forming the expanded portion 1b and narrowed portion 1c are moved in the direction B and pressed against the glass bulb 6, thereby forming the expanded portion 1b and narrowed portion 1c as shown in FIG. 6.

Afterwards, the glass bulb 6 is pumped through the exhaust tube 5 and then filled with a predetermined amount of a halogen element and a rare gas through the exhaust tube 5, and the exhaust tube 5 is sealed, thereby manufacturing the tungsten halogen lamp as shown in FIGS. 1 and 2.

The sealed portion of the exhaust tube 5 corresponds to the sealing tip 1a.

According to the manufacturing method of the invention, since the expanded portion 1b is formed after forming the pinch-sealed portion 1d, distortion of the bulb 1 can be prevented, the commercial value can be prevented from being lowered, and variations in thickness of the wall of the expanded portion 1b and the narrowed portion 1c be suppressed, so that the bulb 1 can be prevented from being broken. When the expanded portion 1b is formed by charging the protective gas, the end opposite to the exhaust tube 5 of the glass bulb 6 is closed by the pinch-sealed portion 1d.

Therefore, it is unnecessary to use the closing member which has been employed conventionally. The manufacturing process can thus be simplified and the cost can be reduced. Particularly, the narrowed portion 1c is formed between the expanded portion 1b and the pinch-sealed portion 1d simultaneously with the formation of the expanded portion 1b. In this consequence, the distortion of the bulb 1 caused by, for example, an effect of the heat used for forming the narrowed portion 1c can be further suppressed, and the manufacturing process can be further simplified.

According to the manufacturing method of the invention, since the expanded portion 1b and the narrowed portion 1c are formed by the dies 9, resultant streaks or joint seams remain on a part of the surface of each of the expanded portion 1b and the narrowed portion 1c. The seams are, however, extremely thin and small, posing no problem optically and from the viewpoint of appearance.

When the outside diameter of the glass bulb 6 is set as d (mm) and the outside diameter of the expanded portion 1b is set as D (mm), and the relational expression of $1 \leq D/d \leq 1.8$ is satisfied, the strength of the expanded portion 1b can be improved, thereby preventing the bulb 1 more reliably from being broken.

On the other hand, if D/d>1.8, the thickness of the wall of the expanded portion 1b becomes too thin, the strength deteriorates, and the bulb 1 is easily broken. While, D/d<1 is not practical because it is hard to manufacture such a glass bulb which satisfies this condition.

When the outside diameter of the narrowed portion 1c is set as S (mm), and the relational expression of $0.5 \leq S/d \leq 1$ is satisfied, the shape of the narrowed portion 1c is stabilized and the optical characteristics can be prevented from being changed. Further, when the dies 9 are pressed, the glass can be prevented from being forced out through the gap between the dies 9 to leave conspicuous streaks on the bulb, which deteriorate the commercial value.

On the other hand, if S/d<0.5, when the narrowed portion 1c is formed, the narrowed portion 1c is compressed excessively to form a thickened portion in the wall of the narrowed portion, which causes the optical characteristics to change. When the thickened portion comes into contact with the filament 2 to cause the coil 2a to be tilted and deviated from the central axis of the bulb 1, the optical characteristics change as well. Further, when the dies 9 are pressed, the glass is forced out through the gap between the dies 9 to leave conspicuous streaks on the bulb, and the commercial value lowers. While, S/d>1 is not practical because it is difficult to manufacture such a glass bulb which satisfies this condition.

Figure 7:
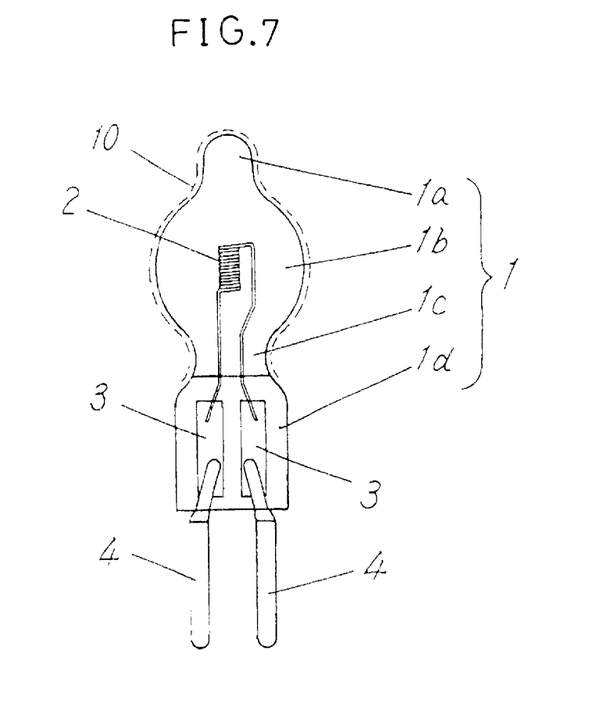
FIG. 7 is a front view of a tungsten halogen lamp manufactured by the method according to the embodiment of the invention and having an infrared-reflecting visible-light-transmitting filter coated on the outer face.

As shown in FIG. 7, an infrared-reflecting visible-light-transmitting filter 10 in which tantalum oxide and silicon oxide are alternately stacked by regular low pressure chemical vapor deposition is formed on the outer face of the expanded portion 1b and the narrowed portion 1c of the tungsten halogen lamp manufactured as mentioned above. As a result, the luminous efficiency can be increased by 30% as compared with that in the case where the visible-light-transmitting infrared-reflecting filter is not formed.

Although the tungsten halogen lamp comprising the bulb 1 having the expanded portion 1b and the narrowed portion 1c has been described in the foregoing embodiment, similar effects can be also obtained by a tungsten halogen lamp in which the expanded portion 1b and the pinch-sealed portion 1d are formed to be directly connected to each other without the narrowed portion 1c therebetween.

Although the case of using the bulb 1 having the expanded portion 1b of a spheroidal shape has been described in the foregoing embodiment, effects similar to the above can be also obtained in the case where a bulb having an expanded portion of a spherical shape is used.

Further, although the case of the tungsten halogen lamp rated at 12V has been described in the embodiment, the invention is not limited to the lamp. When the manufacturing method of the invention is applied to a small tungsten halogen lamp rated at 6V, 24V or the like, or a high intensity discharge lamp such as a single ended metal halide lamp, effects similar to the above can be obtained.

According to the invention as described above, a method for manufacturing an inexpensive lamp can be provided. The method can prevent the distortion of the bulb, thereby preventing the commercial value from lowering, and can suppress variations in thickness of the wall of the bulb, thereby preventing the bulb from being broken.

What is claimed is:

1. A method for manufacturing a lamp comprising a bulb containing a filament and having an expanded portion and a pinch-sealed portion, the lamp manufacturing method comprising:

softening a bulb communicating at one end thereof with an exhaust tube with the filament located inside the bulb;

pinch-sealing the end opposite to the exhaust tube of the bulb; and forming the expanded portion by charging a protective gas from the exhaust tube, wherein by pressing dies each having a predetermined shape against the bulb, a narrowed portion is formed between the expanded portion and the pinch-sealed portion, simultaneously with the formation of the expanded portion, so that $0.5 \leq S/d \leq 1$, wherein the outside diameter of the bulb is d (mm) and the outside diameter of the narrowed portion is S (mm).

2. The lamp manufacturing method according to claim 1, wherein said softening the bulb comprises heating a portion of the bulb to be formed as the pinch-sealed portion and heating the other portion of the bulb.

3. The lamp manufacturing method according to claim 2, wherein while the pinch-sealed portion is being formed after the heating, the other bulb portion is, continuously heated.

4. The lamp manufacturing method according to claim 1, so that $1 \leq D/d \leq 1.8$, wherein the outside diameter of the bulb is d (mm) and the outside diameter of the expanded portion is D (mm).

* * * * *